A. R. LUSCHKA.
HASP FASTENER.
APPLICATION FILED APR. 15, 1907.
929,612.
Patented July 27, 1909.
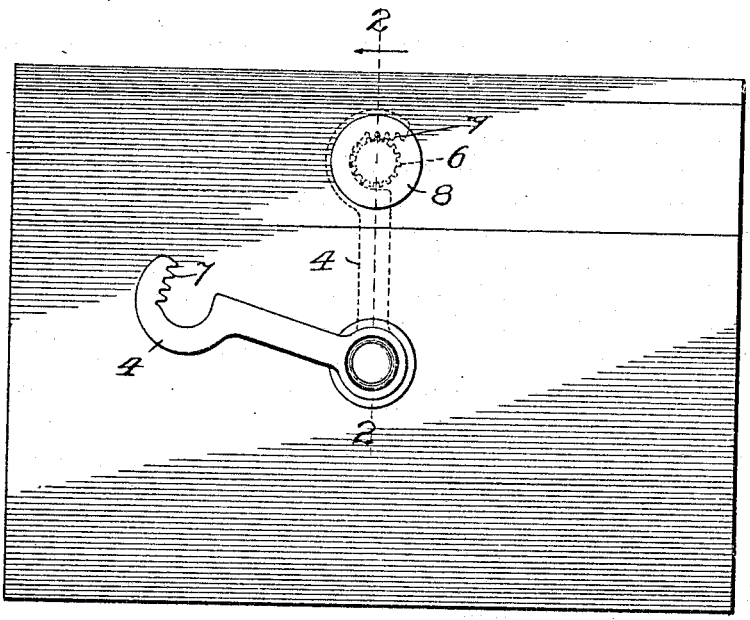
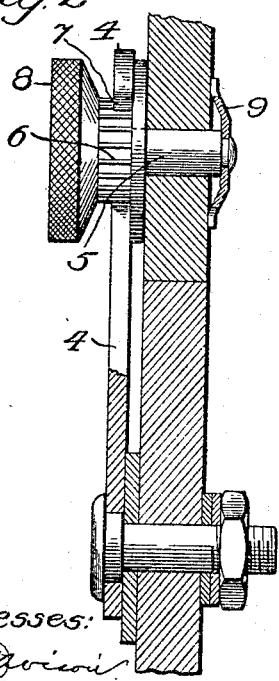
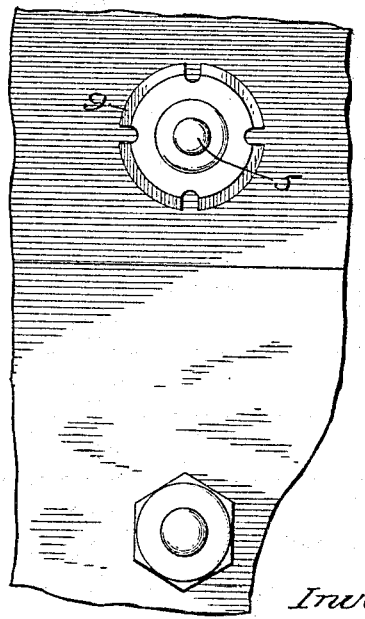
Witnesses:
Inventor,
August R. Luschka,
By Barton, Tanner & Folk,
Attys.

UNITED STATES PATENT OFFICE.

AUGUST R. LUSCHKA, OF CHICAGO, ILLINOIS, ASSIGNOR TO WESTERN ELECTRIC COMPANY, OF CHICAGO, ILLINOIS, A CORPORATION OF ILLINOIS.

HASP-FASTENER.

No. 929,612.

Specification of Letters Patent.

Patented July 27, 1909.

Application filed April 15, 1907. Serial No. 368,266.

*To all whom it may concern:*

Be it known that I, AUGUST R. LUSCHKA, a citizen of the Republic of Switzerland, residing at Chicago, in the county of Cook and State of Illinois, have invented a certain new and useful Improvement in Hasp-Fasteners, of which the following is a full, clear, concise, and exact description.

My invention relates to a hasp fastener, and its object is to provide an improved simple means for locking the separable members in their closed position so as to prevent them from jarring loose or otherwise accidentally opening, the construction being such as to permit quick and easy unlocking when it is desired to open the fastener.

I will describe my invention by reference to the accompanying drawing, in which—

Figure 1 is a front view of the fastener as applied to a box, for securing the cover thereof; Fig. 2 is a side elevation partly in section on line 2—2 of Fig. 1; and Fig. 3 is a rear view.

The same letters of reference indicate the same parts wherever they are shown.

The main parts of the device are the pivoted hook 4 and the stud 5 with which it engages, these two members having teeth which are adapted to intermesh so as to lock the hook in place upon the stud. As shown, the stud, which is rotatable, has teeth 6 like those of a pinion, while the inner edge of the hook is toothed at 7 to form a rack adapted to be engaged by the teeth of said pinion or stud. The stud is provided with an enlarged knurled head 8 which may be easily grasped to turn it when required. A certain amount of frictional resistance to the turning of the stud is desirable, and may be secured by means of a spring-washer 9 mounted upon the rear end of the stud and tending to press the same firmly against its seat as shown in Figs. 2 and 3.

The fastener is closed by turning the hook until it engages the stud and then rotating the stud by means of the knurled head to cause the teeth of the rack and pinion to intermesh, thus drawing the hook well over the stud into its closed position. The fastener is now locked, and cannot be opened by jarring, but can be instantly unlocked when desired by merely turning the pinion-stud in the reverse direction.

The fastener above described was designed particularly for use as a means of securing the covers of automobile spark-coil boxes, but will be generally useful in any place where an ordinary fastener would be jarred open.

I claim:

1. A fastener comprising a pivoted hook and a rotatable pinion stud, said stud being provided with means, controlled by the rotation of the stud, for engaging the inner jaw of said hook to lock the parts in a closed position.

2. A fastener comprising a pivoted hook and a rotatable stud adapted to be engaged by said hook, said stud having one or more teeth adapted when the stud is turned to engage the inner jaw of said hook and prevent it from leaving the stud.

3. A fastener comprising a pivoted hook having a row of teeth forming a rack along the inner edge of its jaw, and a rotatable pinion-stud adapted to engage and intermesh with the teeth of said hook.

4. A fastener comprising a pivoted hook having teeth along the inner edge of its jaw and a rotatable pinion-stud adapted to be engaged by said toothed hook, said stud having a spring-washer adapted to resist turning thereof, and a knurled head whereby it may be turned against such frictional resistance.

In witness whereof, I hereunto subscribe my name this 12th day of April A. D., 1907.

AUGUST R. LUSCHKA.

Witnesses:
JOHN G. ROBERTS,
R. G. JOHANSEN.